Figure 1:
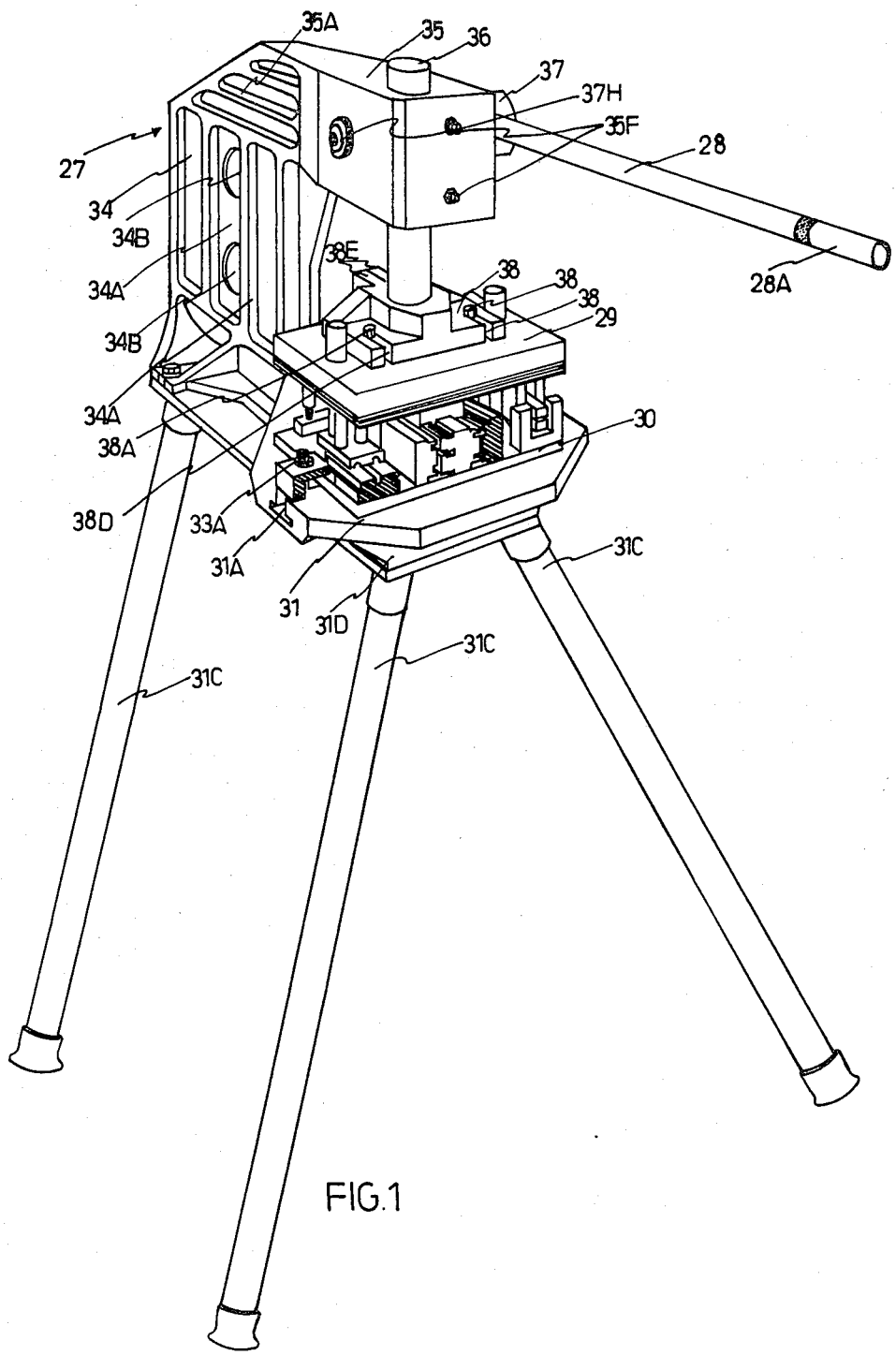
Figure 2:
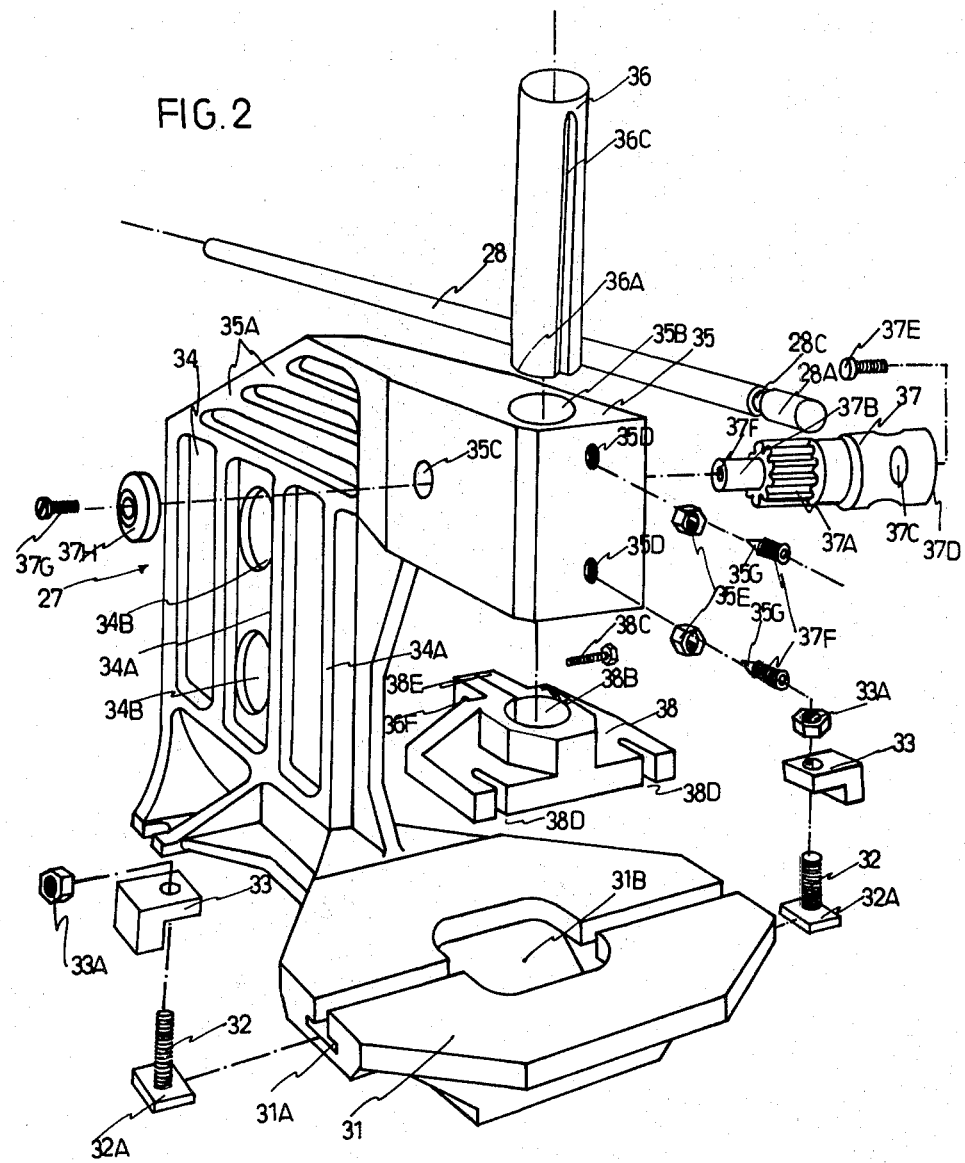
Figure 3:
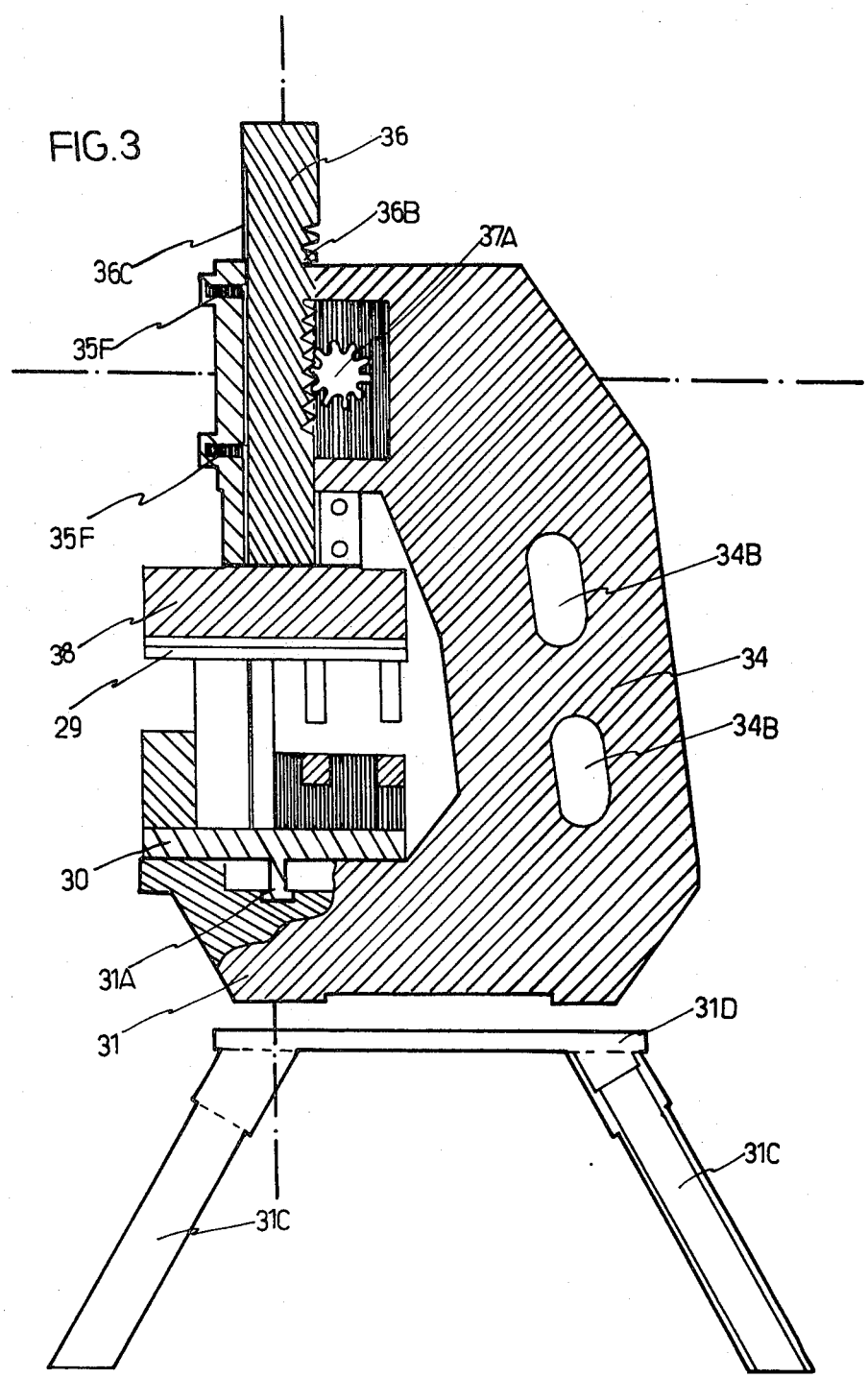
Figure 4:
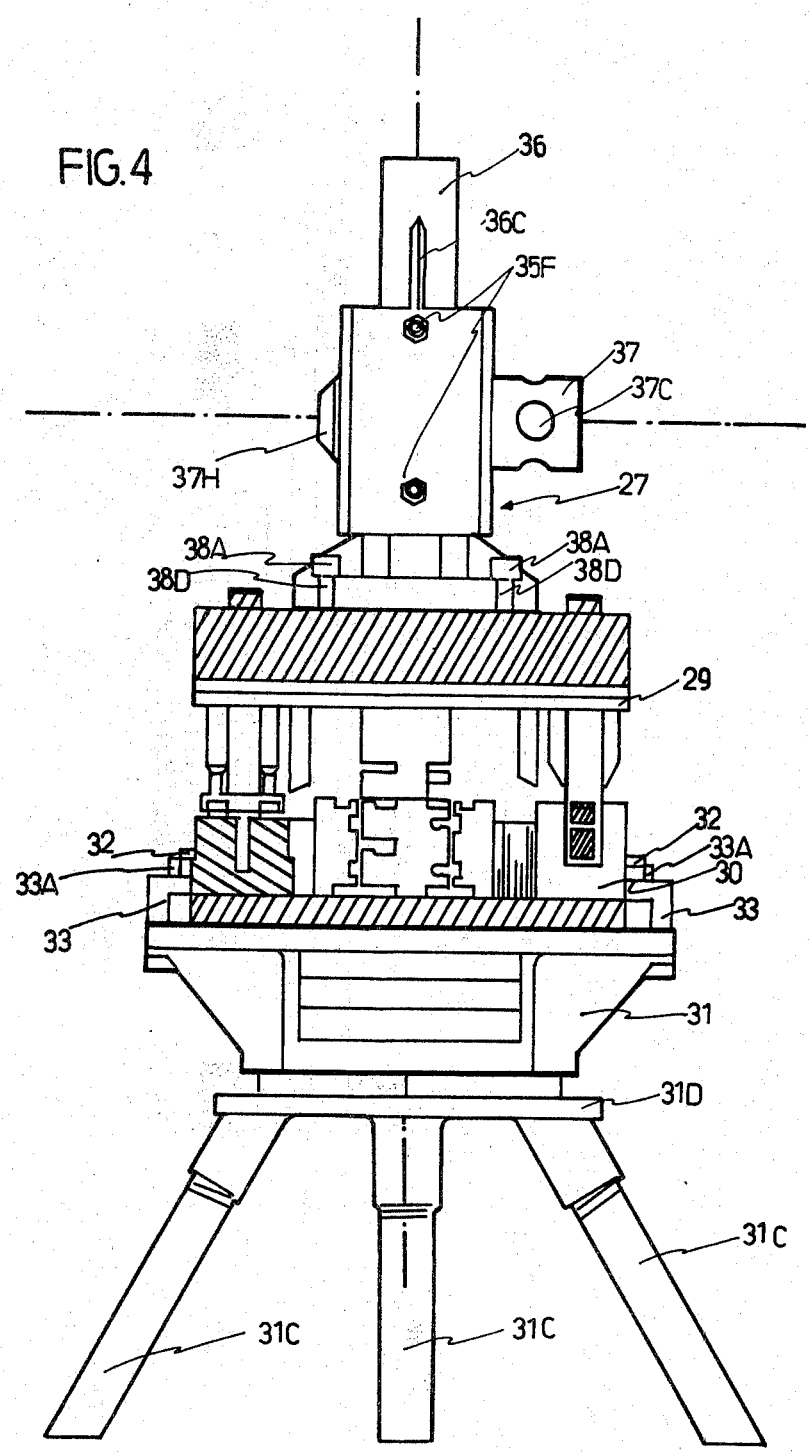
Figure 5:
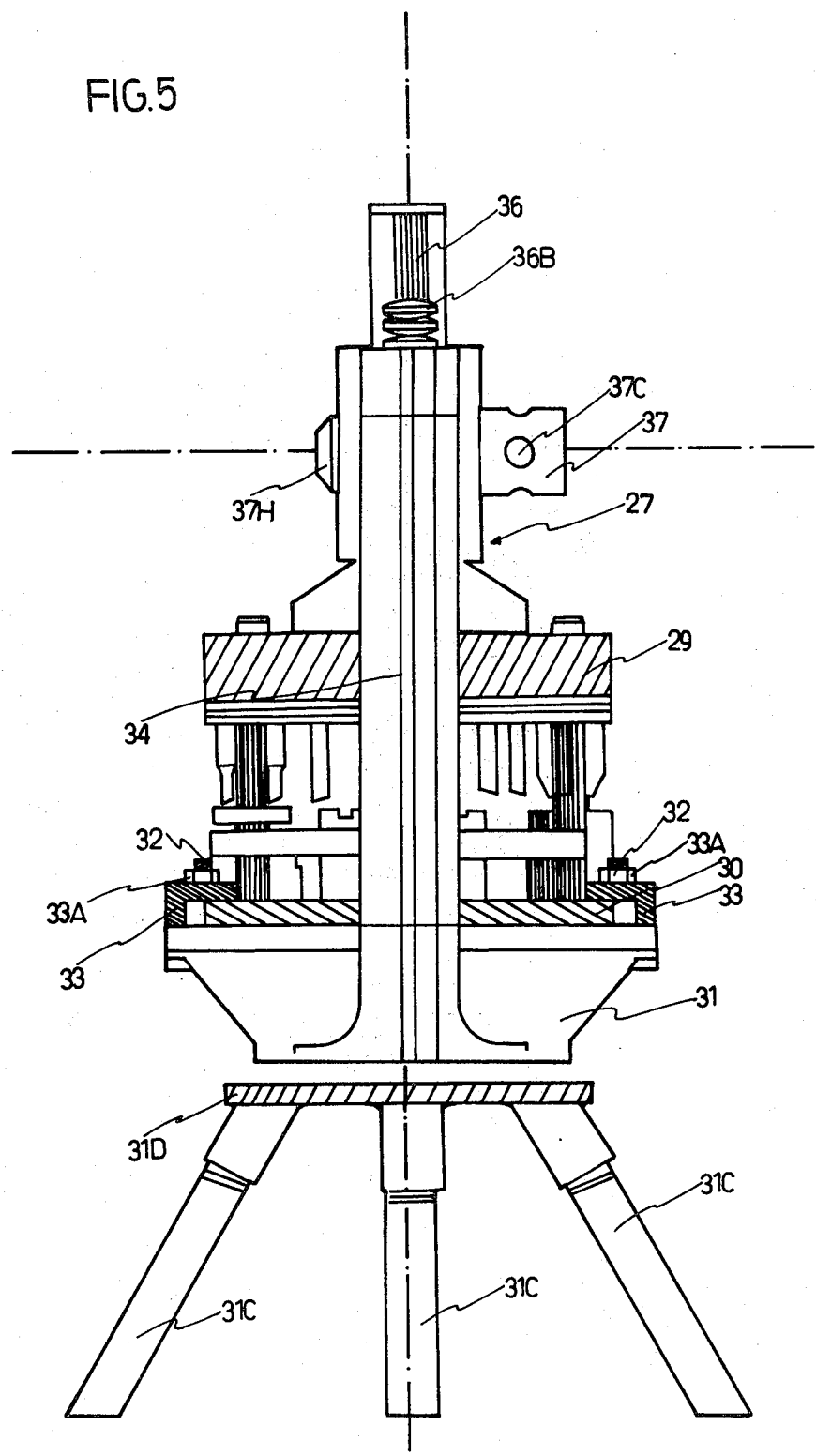
Figure 6:
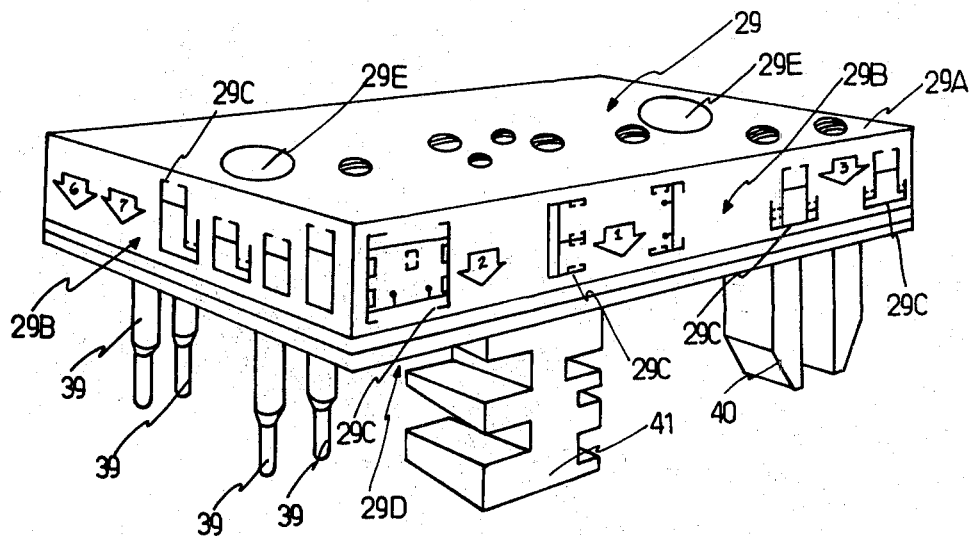
Figure 7:
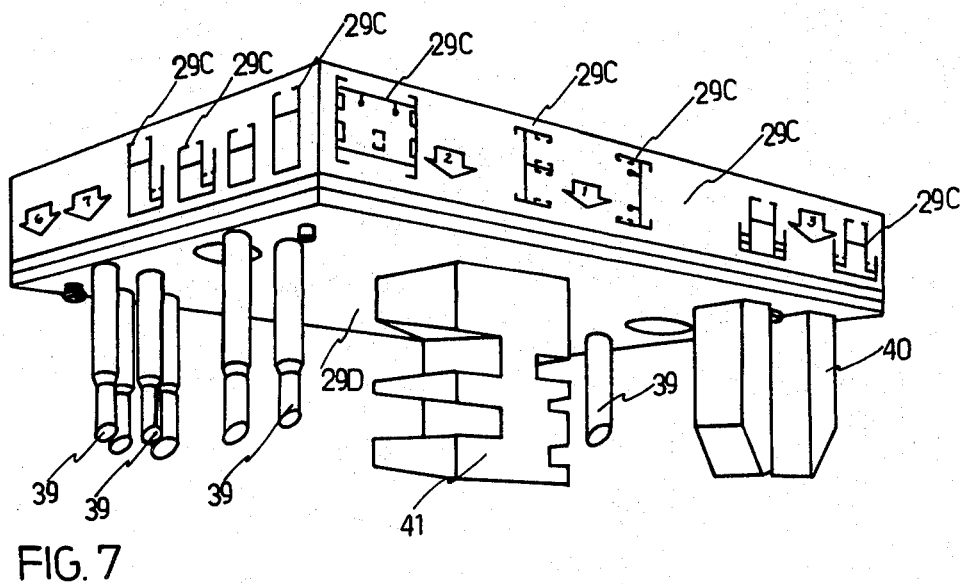
Figure 9:
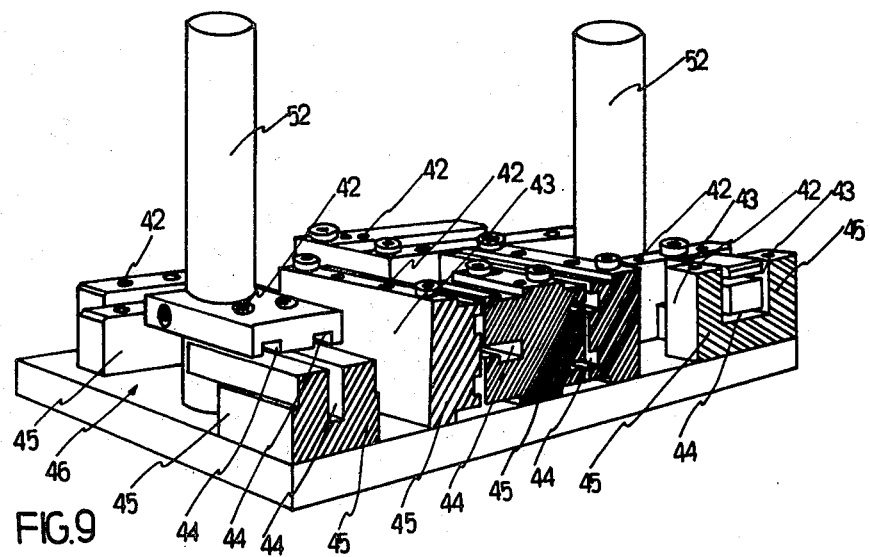
Figure 8:
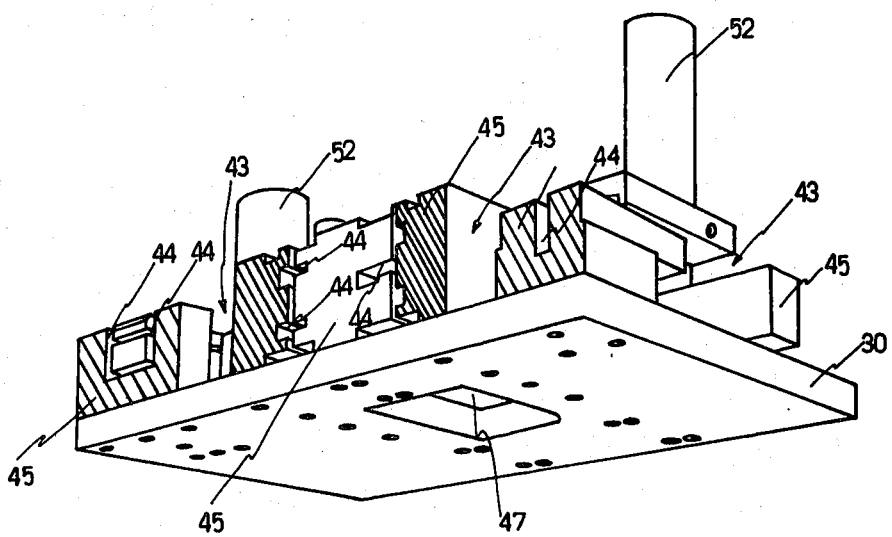
Figure 10:
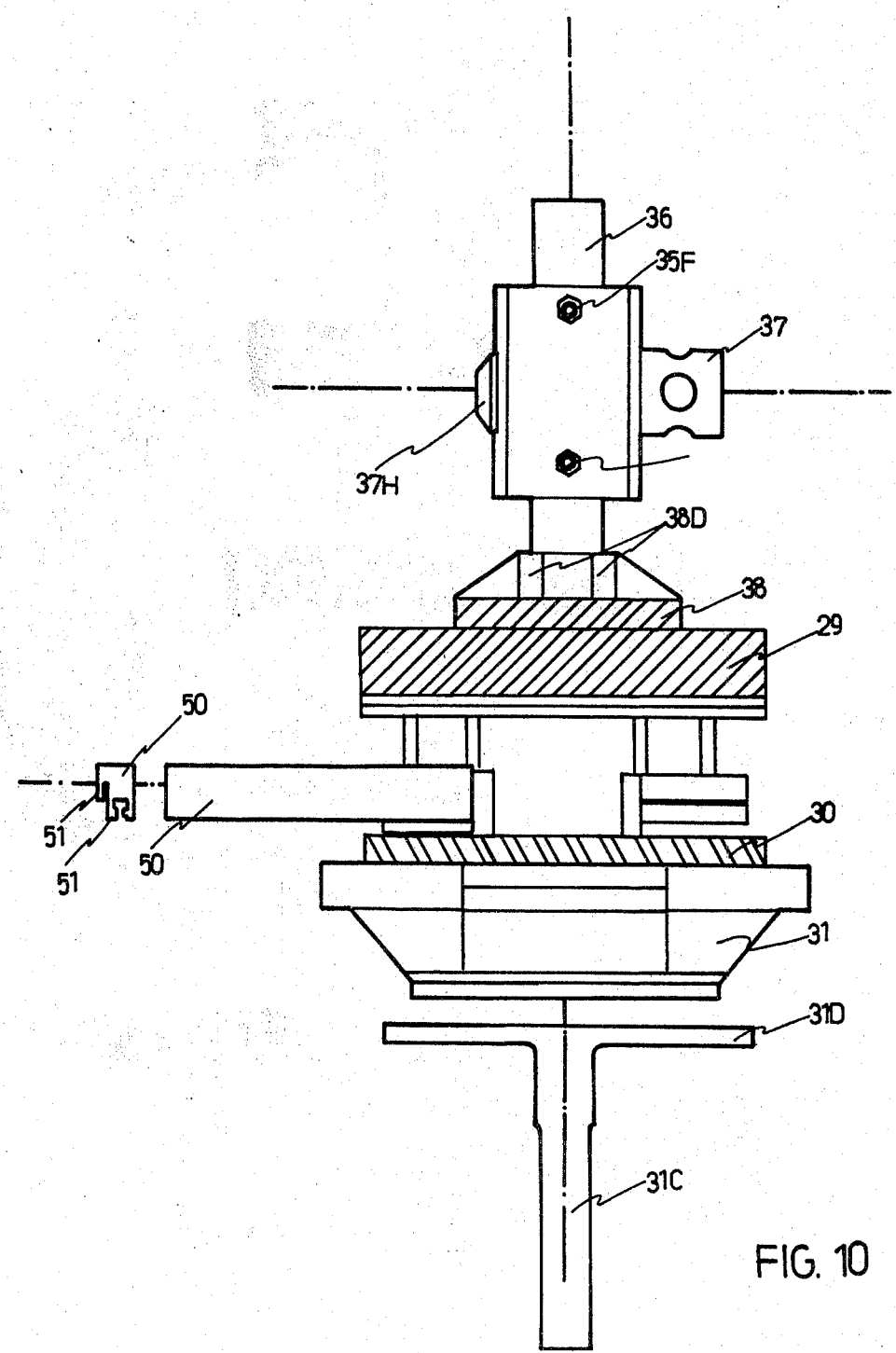
Figure 11:
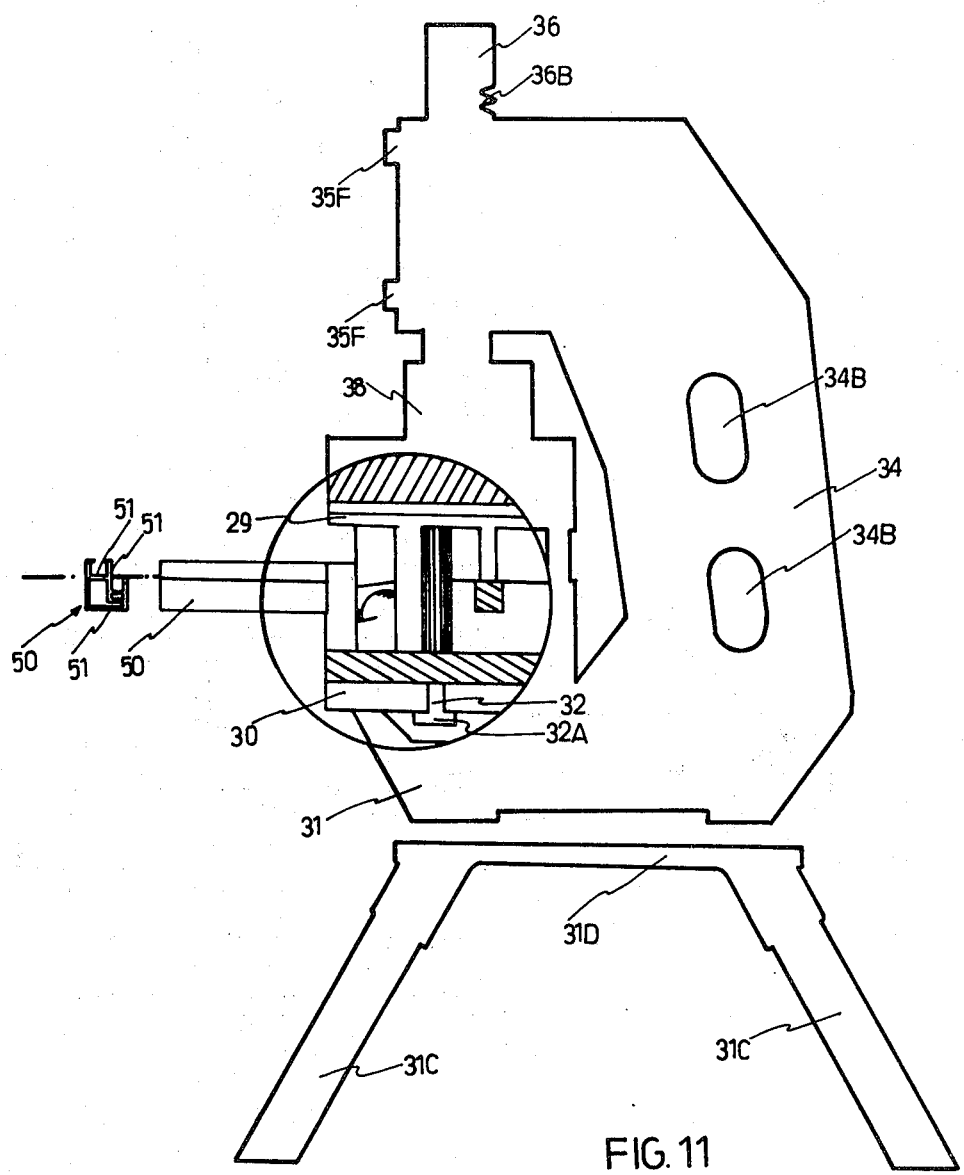
Figure 12:
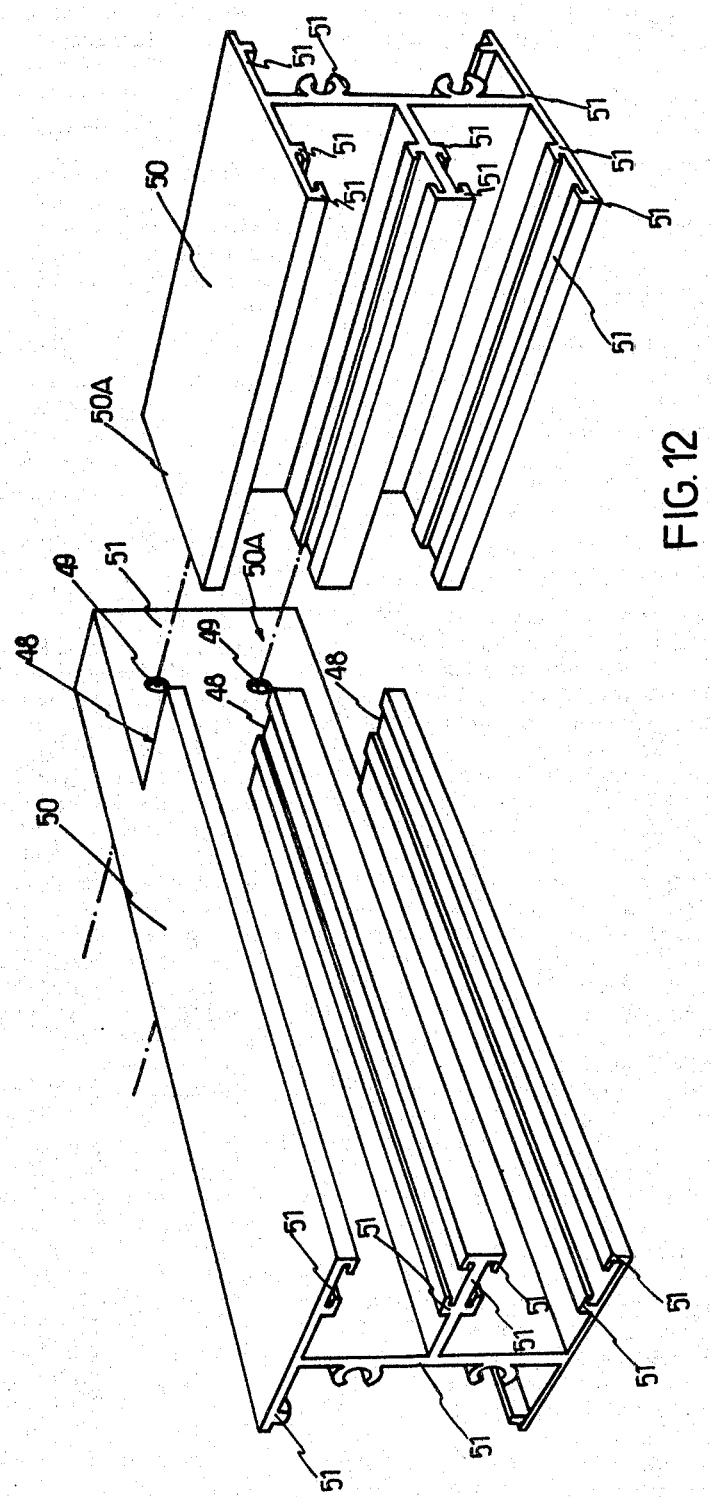

United States Patent [19]

Mireles-Saldivar

[11] Patent Number: 4,468,995
[45] Date of Patent: Sep. 4, 1984

[54] APPARATUS FOR MANUFACTURING FRAMES FROM ALUMINUM PROFILE RAILS

[75] Inventor: Jose M. Mireles-Saldivar, Monterrey, Mexico

[73] Assignee: Cuprum, S.A., Monterrey, Mexico

[21] Appl. No.: 338,290

[22] Filed: Jan. 11, 1982

[51] Int. Cl.³ .......................................... B23D 23/00
[52] U.S. Cl. ...................................... 83/620; 83/465; 83/629; 83/682; 83/701
[58] Field of Search .................. 83/620, 629, 637, 682, 83/465, 466.1, 520

[56] References Cited

U.S. PATENT DOCUMENTS

| | | | |
|---|---|---|---|
| 1,128,450 | 2/1915 | Jaques, Jr. | 83/629 X |
| 1,558,289 | 10/1925 | Rosenberg | 83/629 X |
| 1,721,276 | 7/1929 | Marsilius | 83/629 X |
| 1,817,428 | 8/1931 | Takamatsu | 83/629 |
| 3,267,789 | 8/1966 | Brook | 83/629 X |
| 4,082,026 | 4/1978 | Miyazaki | 83/465 X |
| 4,106,379 | 8/1978 | Spengler | 83/465 X |
| 4,191,080 | 3/1980 | Graham | 83/620 X |
| 4,286,354 | 9/1981 | Weinhaus | 83/466.1 X |
| 4,354,407 | 10/1982 | Daudi et al. | 83/620 X |

FOREIGN PATENT DOCUMENTS 618276  3/1927  France ................... 83/629

Primary Examiner—Frank T. Yost
Attorney, Agent, or Firm—Laurence R. Brown

[57] ABSTRACT

This invention relates with the method for manufacturing frames from aluminum profile rails, which undergo a series of cuts and perforations, done with a mechanism formed by two sections, an upper section which is made up of an upper plate to which a determined number of perforating bolts and knives are attached perpendicularly and a lower plate to which a determined number of blocks with different designs on their faces are affixed, resulting, as a consequence, a number of cavities into some of which aluminum profile rails will be inserted for cutting and perforation; and in others the perforating bolts and knives will penetrate making the cuts on the profile rails possible. Both sections are mounted on a support which by way of removable legs (preferable a tripod) can be positioned for operation.

3 Claims, 12 Drawing Figures

APPARATUS FOR MANUFACTURING FRAMES FROM ALUMINUM PROFILE RAILS

SUMMARY OF THE INVENTION

This invention relates with the method for manufacturing frames from aluminum profile rails, which undergo a series of cuts and perforations, done with a mechanism formed by two sections, an upper section which is made up of an upper plate to which a determined number of perforating bolts and knives are attached perpendicularly and a lower plate to which a determined number of blocks with different designs on their faces are affixed, resulting, as a consequence, a number of cavities into some of which aluminum profile rails will be inserted for cutting and perforation; and in others the perforating bolts and knives will penetrate making the cuts on the profile rails possible. Both sections are mounted on a support which by way of removable legs (preferable a tripod) can be positioned for operation.

BACKGROUND OF THE INVENTION

For many years, frames out of aluminum profile rails have been manufactured, and therefore, there are many methods known for manufacturing them using extremely heavy and complicated cutting machines which, due to their characteristics, make the production of frames "in situ" impossible.

There exist means and methods based on the use of common tools such as the saw, the hammer, drills and manual presses, which, due to the way in which they work, do not allow production to be carried out with precision, accuracy and presentation which aluminum requires; it is well-known that once put into place, it shows the construction errors which are impossible to cover up.

Diverse methods using tools which are apparently the same as the one described in this application have also been known of for a long time but they lack the special characteristics of manageability, versatility, portability and, more important: simplicity of operation.

The object of this invention is to provide the manufacturers with a tool by which it is possible to manufacture the aluminum frames on the job, making it possible to work with exactness and economy which means taking measurements, checking and rechecking them immediately, as the case may require.

Other objects and many of the attendant advantages of this invention will be readily appreciated as the same becomes better understood by reference to the following detailed description when considered in connection with the accompanying drawings wherein:

FIG. #1 shows a perspective view of the apparatus mounted on a tripod.

FIG. #2 shows an exploded view of the support.

FIG. #3 shows a lateral view, partly in cross-cut of the apparatus.

FIG. #4 shows a front view of the apparatus.

FIG. #5 shows a back view of the apparatus.

FIG. #6 shows an upper view of the upper plate.

FIG. #7 shows a lower view of the upper plate.

FIG. #8 shows a lower view of the lower plate.

FIG. #9 shows an upper view of the lower plate.

FIG. #10 shows a schematic front view of the apparatus when a section for cutting or perforating is inserted in it.

FIG. #11 shows a view (partially in cross-cut) of the way in which the bolts and the knives have perforated or cut the aluminum sections.

FIG. #12 shows the way in which two ends, already cut of the two aluminum sections are joined.

DESCRIPTION OF THE INVENTION

With reference to said figures, this apparatus is characterized by the combination of an upper plate (29) and a lower plate (30) which mounted on the support (27) can collapse one over the other as a consequence of the pressure which is exerted when the lever (28) is activated.

The support (27) is formed by the combination of a base (31) which has a "T" channel (31 A) in which the base (32 A) of the set screws (32), are inserted, through which the flanges (33) will fasten the lower plate (30) when the set screws (32) are fastened with nuts (33 A).

In the center of the base (31) there is a window (31 B) with which the discharge hole (47) of the lower plate (30) coincides in such a way that when carrying out the cutting operation, the waste material can be expelled through the hole (47) of the lower section (30) and the cavity (31 B) of the base (31).

The back part of the support (27) is formed by a reinforced column (34) which aside from having a number of ribs (34 A) has orifices (34 B) whose principal function is to facilitate the handling of the support (27).

The upper part of the support (27) is made up of a gudgeon (35) forming a single body with the column (34) which has a number of ribs (35 A) which reinforce the gudgeon (35) for its effective operation. In the front part of the gudgeon (35) there is a vertical cylindrical cavity (35 B) in which the shaft (36) is located and operates; in the same way the gudgeon (35) has a horizontal cavity (35 C) in which the end (37 B) of the driving gear (37) is inserted. On its front face, the gudgeon (35) has threaded orifices (35 D) into which the screws (35 F) are inserted, which, aided by the pressure nuts (35 E) dig their tips (35 G) into the guide (36 C) so that the shaft (36) operates perpendicularly with an exact movement.

In order to operate the raising and lowering of the upper plate (29) the support (27) has a coupling (38) which has an orifice (38 B) on its upper cover into which is inserted by pressure the bottom end (36 A) of the shaft with which the coupling (38) remains fixed. At the same time the shaft (36) is constructed to be mounted on the gudgeon (35) through the gear which is produced between the rack (36 B) and the teeth (37 A) of the gear (37) the latter fastening itself inside the horizontal cavity (35 C) in order to raise and lower the shaft when the lever (28) is operated, and for this reason, the gear (37) has an orifice (37 C) in which the end (28 A) of the lever (28) is inserted.

The coupling (38) has grooves (38 D) to receive the screws (38 C) which with the upper bolts (38 A) will fasten the coupling (38) to upper plate (29). To affix coupling 38 to the support (27), the back side of the coupling (38) has ends (38 E) with the orifice (36 F) into which is inserted the regulating screw (38 C) which when operated will bring together the ends, uniting with pressure the coupling (38) to the lower end (36 A) of the shaft (36) asuming the position for operation.

The gear (37) also has a threaded orifice (37 D) in which the depresser (37 E) is inserted holding the lever (28) in place by means of a groove (28 C) on the end in which the depresser (37 E) is inserted. In order for the gear to remain in position, it has an orifice (37 F) in which is the screw (37 G) will locate, assuring that the flat cap (37 H) will stop the accidental displacement of the gear.

The support (27) for its operation can be placed on legs (31 C) which have a platform (31 D) which gives the structure necessary for operation.

As expressed in the beginning, the cutting apparatus is essentially formed out of three principal parts: a support (27), an upper plate (29) and a lower plate (30).

In detail, the upper plate is formed by the combination of the body (29 A) whose walls (29 B) have a series of drawings (29 C) engraved whose function is essential, since these are those which indicate to the operator of the apparatus, the steps to follow in order to make the different movements of insertion of the aluminum profile rails (50) which would result in the necessary cuts for the correct union of the aluminum profile rails (50) and, as a consequence, produce the frames, windows and doors.

United perpendicularly to the lower face (29 D) of the upper plate (29) are a number of punches (39), knives (40) and forming dies (41), which upon lowering the upper plate (29) onto the lower plate (30) by moving the lever (28) penetrate through the different orifices (42) and cavities (43) thereby cutting and perforating the aluminum profile rails (50) which beforehand has been inserted in the grooves (44) of the lower dies (45) which are found located on the upper face (46) of the lower plate (30).

It is of vital importance to note that the grooves (44) of the lower dies (45) have exactly the same profile design as the walls (51) of the aluminum profile rails (50), making it possible upon carrying out the cutting and perforating operation, that all and each one of the walls (51) have an area of sufficient support so that upon receiving the impact of the punches (39) and knives (40) it does not become deformed in any way, allowing it to make extremely precise cuts and perforations, which are limited exclusively by the size of the orifices (42) and the cavities (43).

The upper plate is cut through with master orifices (29 E) through which the posts (52) penetrate assuring that the lowering of the upper plate (29) onto the lower plate (30) will always be done with the exact precision required so that the punches (39) as well as the knives (40) are inserted exactly into the orifices (42) and cavities (43) and in this way, the cuts and perforations are done exactly.

With the object of being able to carry out an infinite number of cuts on an infinite number of sections (50), the punches (39), the knives (40), the die or the forming dies (41) and the lower dies (45) are removable, making possible their substitution.

The lower plate (30) has a discharge hole (47), which when coincided with the window (31 B) serves as the outlet for the scraps which result from the cuts and perforations.

As a consequence of the combination of mechanisms described beforehand, it is possible to produce cuts (48) and perforations (49) on the aluminum profile rails (50) submitted to the process, which once carried out, permit the fitting of the ends (50 A) of the aluminum profile rails (50) in order to produce the frames of the doors and windows.

FORM OF OPERATION

Although the previous description of the operation mechanism can be relatively easily understood, so that there is no doubt about the way the apparatus operates, we describe as follows the method for producing a frame. The operator will first decide what type of frame he wishes to produce, he will then look at the instructions (29 C) illustrated on the walls (29 B) of the upper plate (29) (the instructions can be illustrated on any of the plates (29, 30)), and they will indicate to the operator the type of aluminum profile rails (50) which he should use and in what order he should insert the same into the different cavities (44) of the dies, inserting the aluminum profile rails (50) the operator moves the lever (28) and makes the cut; in the same way all and each of the necessary cuts (48) or perforations (49) will be made (which will all be made without modifying the position of the dies (41, 45)) and in that way the different pieces which in the end will form the desired frame.

What I claim is:

1. Portable apparatus for precisely shaping by cutting and punching the ends of preformed aluminum rail members of particular complex profile designs for forming in situ frames therewith for windows and doors, comprising in combination, a base member with a shaped groove running therethrough, a lower die support member, means seating in the groove to clamp the lower die support member immovably in place on the base member, a vertically oriented support column reinforced by ribs and orifices to provide handhold members extending from the base member for carrying the apparatus, a horizontally extending gudgeon member extending from the support column substantially parallel above the base member, having a cylindrical shaft journalling cavity above the base member, a cylindrical shaft extending through the cavity with means preventing rotation thereof, manually operable gear means on the gudgeon to position the shaft vertically in the cavity, an upper die set having a plurality of die parts thereon of different profile shapes positioned to receive the rail ends thereinto at various stages of shaping, said die set having support means for vertically moving the dies with the shaft to engage a set of mating die parts on said lower die member for performing a series of shaping die cut operations as said rail member with the rail member end positioned at various positions in the mating die parts of the lower die member, said mating die parts on both the lower die support member and the movable shaft being removably secured thereon and said mating die parts secured on said lower die member being shaped with exactly the same profile design as the rail and surrounding the rail for supporting substantially the entire rail profile being processed without play to receive the impact of the mating dies on the movable shaft without deformation of the rail member profile shape and oriented to receive the ends of the rail members thereinto at said various positions.

2. The apparatus defined in claim 1 wherein an upper die support plate is affixed to the shaft for movement therewith by means of a coupling member removably grasping the shaft and the die support plate by means of screws.

3. The apparatus defined in claim 1 including indicating means positioned on the upper die set for visibility by an operator using the apparatus displaying a sequence of graphically illustrated instructions for several steps for forming frames from the rail members.

* * * * *